(12) United States Patent
Saito et al.

(10) Patent No.: US 7,724,140 B2
(45) Date of Patent: May 25, 2010

(54) ANTENNA, TAG COMMUNICATION APPARATUS, TAG COMMUNICATION SYSTEM, SCANNING ADJUSTING METHOD FOR TAG COMMUNICATION APPARATUS AND COMPUTER READABLE MEDIUM

(75) Inventors: Keisuke Saito, Kyoto (JP); Shinichiro Okamura, Kyoto (JP); Takehiro Kawai, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 316 days.

(21) Appl. No.: 11/170,435

(22) Filed: Jun. 30, 2005

(65) Prior Publication Data
US 2006/0001585 A1 Jan. 5, 2006

(30) Foreign Application Priority Data
Jul. 1, 2004 (JP) ............................... 2004-195979

(51) Int. Cl.
*G08B 13/14* (2006.01)
(52) U.S. Cl. .................. 340/572.7; 235/385; 340/10.1; 340/572.1
(58) Field of Classification Search ............. 340/572.1, 340/572.7, 10.1, 825.49, 572.4; 343/754, 343/702, 701; 455/562.1, 272, 575.7; 342/368
See application file for complete search history.

(56) References Cited

U.S. PATENT DOCUMENTS

| | | | |
|---|---|---|---|
| 5,381,137 A | 1/1995 | Ghaem et al. | |
| 6,078,251 A | 6/2000 | Landt et al. | |
| 6,198,445 B1 * | 3/2001 | Alt et al. | 343/705 |
| 6,320,509 B1 | 11/2001 | Brady et al. | |
| 6,335,685 B1 * | 1/2002 | Schrott et al. | 340/572.1 |
| 6,542,083 B1 * | 4/2003 | Richley et al. | 340/825.49 |
| 6,687,293 B1 | 2/2004 | Loyer et al. | |
| 6,866,193 B1 * | 3/2005 | Shimizu et al. | 235/383 |
| 6,922,173 B2 * | 7/2005 | Anderson | 343/701 |
| 7,142,120 B2 * | 11/2006 | Charych et al. | 340/572.4 |
| 7,183,922 B2 * | 2/2007 | Mendolia et al. | 340/572.1 |
| 7,212,120 B2 * | 5/2007 | Gudat | 340/572.1 |
| 2003/0006121 A1 | 1/2003 | Lee et al. | |
| 2003/0066537 A1 * | 4/2003 | Fabian et al. | 128/899 |
| 2003/0179093 A1 * | 9/2003 | Hartmann et al. | 340/572.7 |

FOREIGN PATENT DOCUMENTS

| | | |
|---|---|---|
| EP | 0 135 049 A1 | 3/1985 |
| JP | 63-208777 | 8/1988 |
| JP | 05-19049 | 1/1993 |
| JP | 9-5431 | 1/1997 |
| JP | 09-200115 | 7/1997 |
| JP | 11-134592 | 5/1999 |
| JP | 2002-151944 | 5/2002 |
| JP | 2002-198722 | 7/2002 |
| JP | 2002-271229 | 9/2002 |
| JP | 2002-344228 | 11/2002 |
| JP | 2004-112646 | 4/2004 |
| JP | 2004-132732 | 4/2004 |

* cited by examiner

*Primary Examiner*—Brent Swarthout
(74) *Attorney, Agent, or Firm*—Foley & Lardner LLP

(57) ABSTRACT

An RFID reader/writer performs a radio communication with an RFID tag. An antenna for tag communication used in the RFID reader/writer is a beam scanning antenna that can perform scanning with the beam of a transmitted radio wave. The beam has a high directivity in a certain scanning direction. The scanning with the beam is performed so that a plane including the certain scanning direction intersects with a floor surface as a reflecting surface on which the strongest reflected wave is generated.

10 Claims, 12 Drawing Sheets

ANTENNA, TAG COMMUNICATION APPARATUS, TAG COMMUNICATION SYSTEM, SCANNING ADJUSTING METHOD FOR TAG COMMUNICATION APPARATUS AND COMPUTER READABLE MEDIUM

This application claims foreign priority based on Japanese Patent application No. 2004-195979, filed Jul. 1, 2004, the contents of which is incorporated herein by reference in its entirety.

BACKGROUND OF THE INVENTION

1. Field of the Invention

The present invention relates to an apparatus for communicating with an RFID (Radio Frequency Identification) tag through a radio wave (hereinafter, referred to as tag communication apparatus), an antenna used for the tag communication apparatus, a tag communication system, a scanning adjusting method for tag communication apparatus and a computer readable medium for scanning adjustment.

2. Description of the Related Art

In recent years, technology for RFID (Radio Frequency Identification) in which a tag communication apparatus as a reader and/or writer performs a radio communication with an RFID (Radio Frequency Identification) tag (radio tag) has been progressively employed. Further, the RFID tag is anticipated especially in a field of physical distribution as an alternative of a bar code. Thus, the radio tag is expected to be widely used in near future.

As a communication system between the RFID tag and the tag communication apparatus, there are an electromagnetic induction system and a microwave system. The electromagnetic induction system is used in a frequency band such as a band from 125 k to 135 kHz or a 13.56 MHz band. On the other hand, the microwave system is used in a frequency band such as a 2.45 GHz band, and is considered to be used in what is called an UHF band of approximately from 800 MHz to 960 MHz.

Currently, the electromagnetic induction system has been progressively spread. However, generally, it is easier to extend a communication distance in the microwave system than in the electromagnetic induction system. Further, as the frequency band becomes higher, the size of an antenna of the RFID tag can be more reduced in the microwave system than in the electromagnetic induction system. Therefore, the microwave system is anticipated to be widely used in near future. Accordingly, an RFID tag and a tag communication apparatus of the microwave system have been also progressively developed.

As described above, in the microwave system, the communication distance between the tag communication apparatus and the RFID tag can be easily extended to from about several centimeters to about several meters compared to the electromagnetic induction system. Accordingly, a communication area which is an area where the tag communication apparatus can communicate with the RFID tag can be easily enlarged. However, when the communication area is enlarged, following problems arise.

As an antenna for tag communication which is an antenna of the tag communication apparatus, cases may be considered in which a nondirectional antenna or an antenna having low directivity is used and in which an antenna having high directivity is used. For instance, in JP-A-2002-151944, an RFID system using a Yagi antenna having high directivity is described. However, the communication area of the antenna having high directivity is narrower than that of the antenna having low directivity. Thus, it is difficult to construct a system in which a number of RFID tags can be read and written simultaneously with a small number of antennas.

On the other hand, as a configuration of a system in which a number of RFID tags are read and written simultaneously, configurations of antennas as shown in FIGS. 13 and 14 are generally considered. FIG. 13 shows a communication area when the antenna having low directivity is used. FIG. 14 shows a communication area when the antenna having high directivity is used.

When the antenna having low directivity is employed, a wide communication area 101 can be covered with a small number of antennas 100. However, when the wide communication area 101 is covered with the small number of antennas 100, a number of RFID tags 102 exist in the communication area 101 at the same time. Accordingly, a collision of communication arises between the small number of antennas 100 and the number of RFID tags 102 for a number of times, and the quality of the communication is deteriorated.

Further, when the antenna having low directivity is employed, a incommunicable region in which the tag communication apparatus cannot communicate with the RFID tag is generated in the communication area due to what is called a multipath interference, in which direct waves from the tag communication apparatus and reflected waves from a floor surface or a wall surface interfere with each other. In this case, the RFID tag that cannot communicate with the tag communication apparatus may possibly be generated in the communication area, which is undesirable. Further, there is a high possibility that a communicable region in which the tag communication apparatus can communicate with the RFID tag is generated outside the communication area due to the multipath interference. This is not preferable when the communication area is desired to be limited to a desired area.

To overcome the above-described problem, it is considered that a position, a direction and an output of the antenna are adjusted so that the incommunicable region is not generated. However, since this adjustment needs to be carried out while confirming that the communication can be performed in each part inside the communication area, a lot of time and labor are required.

On the other hand, when an antenna 110 having high directivity is used as shown in FIG. 14, a communication area 111 covered with one antenna is narrower than that when the antenna 100 having low directivity is used as shown in FIG. 13. Thus, the generation of the collision of communication can be suppressed, and the deterioration of the quality of the communication can be suppressed. Further, when the antenna 110 having high directivity is used, an intensity of a radio wave propagated to the floor surface or the wall surface is suppressed. Thus, the problem generated by the multipath interference is avoided.

However, in order to cover a wide communication area with the antenna 110 having high directivity, a number of antennas are necessary as shown in FIG. 14. Further, the size of the antenna 110 having high directivity is larger than that of the antenna 100 having low directivity. Accordingly, the size of the antenna of the tag communication apparatus is extremely enlarged.

SUMMARY OF THE INVENTION

The present invention is proposed by considering the above-described problems, and it is an object of the present invention to provide an antenna for tag communication in which a wide communication area having no incommunicable region can be covered with the small number of antennas having high directivity.

In order to solve the above-described problems, the inventors of the present invention thought to use a beam scanning antenna for the antenna for tag communication in a system in which the RFID tag is used (hereinafter, referred as RFID system). The beam scanning antenna is an antenna having high directivity in which a beam of the radio wave is narrowed down and capable of performing scanning with the beam. The beam scanning antenna is generally employed for a radar as disclosed in JP-A-9-5431 and JP-A-2002-198722, however, has not yet been used as the antenna for tag communication in the RFID system. Thus, the inventors of the present invention changed a form, an advancing direction, a scanning direction, etc. of the beam in various ways by using the beam scanning antenna, and repeatedly examined. Consequently, they devised solving means as described below.

Specifically, in an antenna according to an embodiment of the present invention which communicates with an RFID (Radio Frequency Identification) tag through a radio wave and generates a scanning beam in a space, the scanning beam is narrowed in at least one direction so as to cover a part of the space, and the at least one direction in which the beam is narrowed intersects with a reflecting surface that generates a relatively high intensity reflection.

Here, when the scanning with the beam is performed, the direction in which the beam is narrowed down changes, and the changed direction also intersects with the reflecting surface.

According to the above-described configuration, a beam scanning antenna is employed which is capable of performing scanning with the beam of the transmitted radio wave, so that a communication area can be enlarged compared to an ordinary antenna having high directivity. Accordingly, a wide communication area can be covered with the small number of antennas.

An incommunicable region due to multipath interference is generated when the intensity of the radio wave of a direct wave is substantially the same as the intensity of the radio wave of a reflected wave. Thus, the beam transmitted by the antenna for tag communication according to the present invention is narrowed down in at least one direction, and at least one direction of the direction in which the beam is narrowed down intersects with the reflecting surface.

In this case, since the beam is narrowed down in the direction intersecting with the reflecting surface, the beam is also narrowed down in a direction perpendicular to the reflecting surface. In this case, when the scanning with the beam is performed, and either one of the advancing direction of the direct wave and the advancing direction of a wave before the reflected wave is reflected corresponds to the advancing direction of the beam, the intensity of the radio wave of the direct wave and the intensity of the radio wave of the reflected wave from the reflecting surface respectively change. At this time, when the intensity of the radio wave of the direct wave differs from the intensity of the radio wave of the reflected wave from the reflecting surface, in the incommunicable region, the multipath interference is suppressed so that the tag communication apparatus can communicate with the RFID tag. Accordingly, the antenna for tag communication according to the present invention can cover a wide communication area having no incommunicable region.

In the antenna according to an embodiment of the present invention, the direction intersecting with the reflecting surface is desirably set as a scanning direction of the beam. In this case, since a scanning is performed in the direction in which the beam is narrowed down, a desired area can be effectively scanned.

Further, in the antenna according to an embodiment of the present invention a plane including the scanning direction is desirably substantially perpendicular to the reflecting surface. In this case, since the intensity of the radio wave of the direct wave and the intensity of the radio wave of the reflected wave from the reflecting surface respectively change effectively, the incommunicable region due to the multipath interference can be accurately suppressed and the tag communication apparatus can accurately communicate with the RFID tag.

Further, in the antenna according to an embodiment of the present invention, an advancing direction of the beam desirably includes at least a direction substantially parallel to the reflecting surface. When the advancing direction of the beam is substantially parallel to the reflecting surface, the intensity of the radio wave propagated to the reflecting surface is decreased and the intensity of the radio wave of the reflected wave is also decreased. Thus, the incommunicable region due to the multipath interference can be more accurately suppressed.

Further, in the antenna according to an embodiment of the present invention beam is desirably narrowed only in the scanning direction. In this case, the beam has a form narrow in the scanning direction and wide in other directions. Since the scanning is performed with this beam, a communication area such as that covered with a beam having low directivity in omni-direction, that is, in all directions, as shown in FIG. 13 can be ensured by a single scanning operation.

Further, in the antenna according to an embodiment of the present invention, the antenna is disposed separately from the reflecting surface.

According to the above-described configuration, a space in which the generation of the incommunicable region is suppressed can be ensured between the antenna for tag communication and the reflecting surface. Thus, the tag communication apparatus can communicate with a number of RFID tags passing the space.

A distance between the antenna for tag communication and the reflecting surface is desirably determined, based on an angle between the advancing direction of the beam and the reflecting surface, a space necessary for reading the RFID tag and that no incommunicable region exists in the necessary space, when the advancing direction of the beam is directed to the reflecting surface.

In an embodiment of the present invention, the antenna desirably comprises a plurality of antenna elements, and a phase shifter for shifting phases of signals transmitted to the plurality of antenna elements so as to generate the scanning beam. In this case, since a mechanical configuration for performing scanning with the beam is not required, reliability can be improved.

Further, in the antenna according to an embodiment of the present invention the radio wave is desirably a microwave. The microwave indicates a radio wave whose frequency is from about 300 MHz to about 300 GHz. The microwave is used so that the communication distance between the tag communication apparatus and the RFID tag is easily extended to several meters or more.

Further, an apparatus according to an embodiment of the present invention for communicating with an RFID (Radio Frequency Identification) tag, the apparatus comprises the antenna for tag communication having the above-described configuration, and a scanning control section which controls the scanning with the beam of the radio wave transmitted from the antenna to the space.

The tag communication apparatus having the above-described configuration includes the antenna for tag communication having the above-described configuration. Since the scanning is performed with the beam of the radio wave transmitted from the antenna for tag communication under the control of the scanning control section, the same effects as described above can be obtained.

In the apparatus according to an embodiment of the present invention, the apparatus desirably further comprises a plurality of the antennas. In this case, the scanning range of each antenna for tag communication can be narrowed, so that a scanning time can be shortened.

Further, in the apparatus according to an embodiment of the present invention, at least two of the antennas are desirably disposed separately from each other in a direction substantially perpendicular to the reflecting surface that generates the relatively high intensity reflection. In this case, since an angle between the advancing direction of the beam and the reflecting surface can be narrowed, the influence of the reflected wave is reduced and the multipath interference can be accurately suppressed.

The scanning with the beam is performed by changing the advancing direction of the beam with the position of the antenna fixed. Thus, a communication area in which the tag communication apparatus can communicate with the RFID tag by the scanning is narrower in an area near the antenna for tag communication and wider in an area remote from the antenna. Therefore, in the area near the antenna for tag communication, an incommunicable region may possibly be generated, as the beam does not reach the area.

Accordingly, in the apparatus according to an embodiment of the present invention, at least two of the antennas are desirably disposed opposed to each other. In this case, since an area near one antenna for tag communication serves as a communication area of the opposed antenna for tag communication, the generation of the incommunicable region can be prevented. Further, when the antennas for tag communication which are mutually opposing each other are arranged so as to be shifted in the direction substantially perpendicular to the reflecting surface, an area in which the respective communication area overlaps each other is hardly formed. Thus, the interference of the radio waves from the plurality of the antennas for tag communication can be prevented.

In an embodiment of the present invention, the apparatus further comprises a communication section which communicates with the RFID tag through the antenna, a counting section which counts a number of the RFID tags with which the communication section completes the radio communication, and a scanning adjusting section for adjusting the scanning with the beam by (a) instructing the scanning control section so as to make the antenna perform the scanning with the scanning beam at a certain scanning range and a certain incrementing angle for a certain scanning time, (b) acquiring the number of the RFID tags counted in the counting section during the scanning, (c) repeating (a) and (b) for various scanning ranges, incrementing angles and scanning times, and (d) determining the scanning range, incrementing angle and the scanning time so as to obtain a maximum number of the RFID tags counted in the counting section.

In the above-described configuration, the scanning adjusting section automatically adjusts the scanning time, the scanning range and the incrementing angle so that the number of the RFID tags whose communication is completed becomes the maximum. Accordingly, the antenna is easily tuned so that a desired area becomes a communication area when installing the antenna or in a time of maintenance.

A tag communication system according to an embodiment of the present invention comprises the apparatus having the above-described configuration, and a reflection intensity reducing member which reduces an intensity of the radio wave of a reflected wave, provided in a reflecting surface of the radio wave transmitted from the antenna.

As the reflection intensity reducing member, for instance, a radio wave absorber which is an object adequately absorbing the radio wave, or a diffusive reflection member which is an object diffusing and reflecting the radio wave may be exemplified.

In the above-described configuration, a surface provided with the reflection intensity reducing member among the reflecting surfaces on which the radio wave transmitted from the antenna for tag communication of the tag communication apparatus is reflected reduces the intensity of the radio wave of the reflected wave. Thus, a surface not provided with the reflection intensity reducing member can be specified as a reflecting surface on which the strongest reflected wave is generated. Accordingly, by changing the direction of the beam of the radio wave to a direction perpendicular to the reflecting surface on which the strongest reflected wave is generated, the same effects as described above can be obtained.

A scanning adjusting method according an embodiment of the present invention for adjusting a scanning beam transmitted from the antenna having the above-described configuration to the space, the method comprises (a) performing the scanning with the scanning beam at a certain scanning range and a certain incrementing angle for a certain scanning time, (b) counting a number of RFID tags whose radio communications with the antenna are completed during the scanning, (c) repeating (a) and (b) for various scanning ranges, incrementing angles and scanning times, and (d) determining the scanning range, the incrementing angle and the scanning time so that the counted number of the RFID tags is maximum.

According to the above-described method, since the scanning time, the scanning range and the incrementing angle are automatically adjusted so that the number of the RFID tags whose communication is completed is the maximum. Accordingly, the antenna is easily tuned so that a desired area becomes a communication area when installing the antenna or in a time of maintenance.

The scanning adjusting section in the tag communication apparatus can be executed on a computer by a scanning adjusting program. Further, the scanning adjusting program is stored in a computer readable recording medium. Thus, the scanning adjusting program can be executed on an arbitrary computer.

As described above, in the antenna for tag communication according to the present invention, the beam scanning antenna is employed that can perform the scanning with the beam of the transmitted radio wave. Thus, the communication area can be effectively enlarged compared with the general antenna having high directivity, and the wide communication area can be covered with the small number of antennas. Further, the scanning is performed with the beam so that the plane specified by the scanning direction of the beam intersects with the reflecting surface on which the strongest reflected wave is generated. Thus, the advancing direction of the beam is changed to the reflecting surface by the scanning. Accordingly, in the incommunicable region, the intensity of the radio wave of the direct wave differs from the intensity of the radio wave of the reflected wave from the reflecting surface so that the multipath interference is suppressed, the tag communication apparatus can communicate with the RFID tag and the wide communication area having no incommunicable region can be effectively covered.

BRIEF DESCRIPTION OF THE DRAWINGS

FIGS. 2A and 2B show the RFID system in which the advancing direction of a beam having high directivity is the same as the advancing direction of the direct wave and the advancing direction of a wave before the reflected wave reflects, respectively.

FIG. 2C shows a system of the related art in which a beam having low directivity is transmitted.

FIG. 6A is a plan view.

FIG. 6B is a front view.

FIG. 6C is a side view looking from a side opposed to the beam scanning antenna.

FIGS. 7A to 7C respectively show cases that the radio wave having high directivity is transmitted in the direction of obliquely upward, in the horizontal direction and in the direction of obliquely downward.

FIG. 7D shows a case that the radio wave having low directivity is transmitted, as a comparative example.

FIG. 11A shows a case that only one beam scanning antenna is provided.

FIG. 11B shows a case in which two beam scanning antennas are provided in the vertical direction.

FIG. 11C shows a case in which two beam scanning antennas are provided to be opposed to each other and shifted in the vertical direction.

DESCRIPTION OF THE PREFERRED EMBODIMENTS

Figure 1:
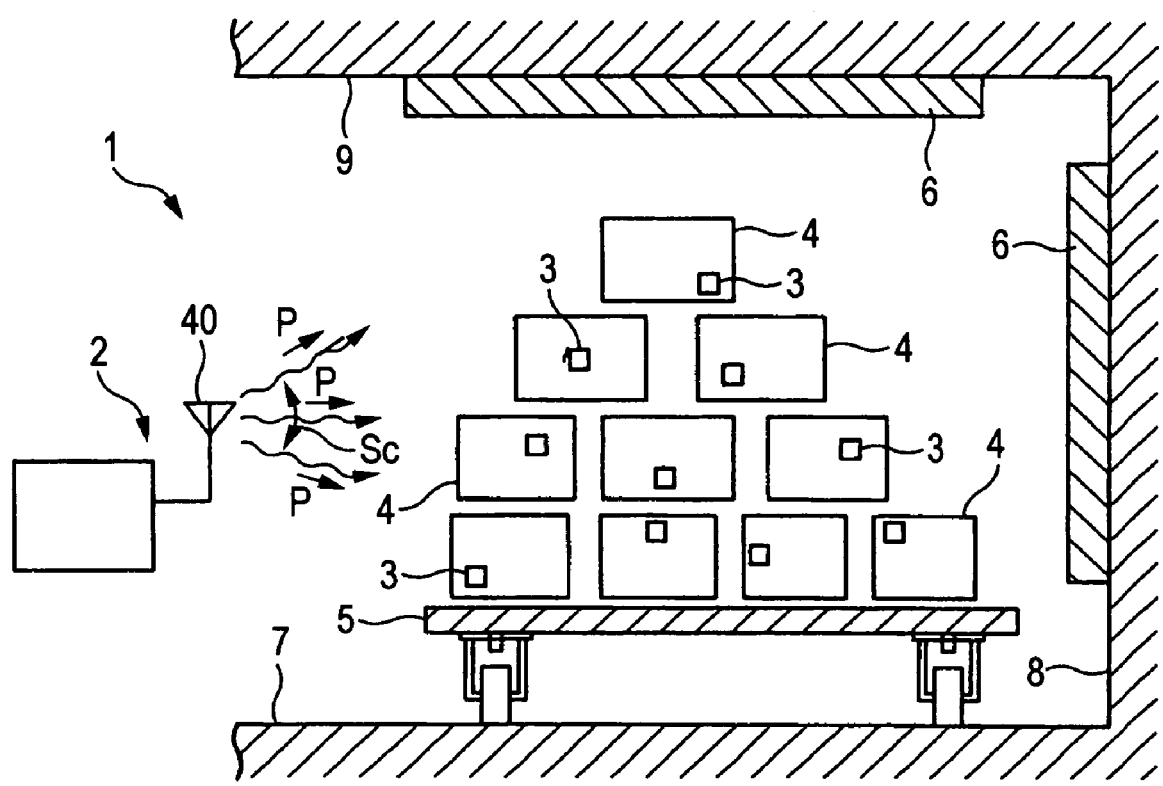
FIG. 1 is a front view showing an outline of an RFID system of an embodiment of the present invention.

Now, an embodiment of the present invention will be described referring to FIGS. 1 to 11. FIG. 1 shows an outline of an RFID system (a tag communication system) of an embodiment. The RFID system 1 serves to identify goods contactless and automatically such as luggage for flight in an airport, cargoes in a physical distribution, works (intermediate goods) during a production process. Specifically, the RFID system 1 is a system in which an RFID reader/writer (hereinafter, referred to just as a reader/writer) 2 performs a radio communication with RFID tags 3 respectively attached to a number of goods 4 that are conveyed by a conveying device 5 such as an automatic transporter and a belt conveyor.

In this embodiment, a frequency band of a radio wave transmitted by the reader/writer (a tag communication apparatus) 2 is what is called a UHF band of approximately from 800 MHz to 960 MHz. Thus, an area in which the reader/writer 2 can communicate with the RFID tags 3 is around and within about several meters from the antenna of the reader/writer 2. Generally, a microwave system using the radio wave of the UHF band or a 2.45 GHz band has an advantage that it is easier to extend a communication distance than that of an electromagnetic induction system using the electromagnetic induction of a band from 125 k to 135 kHz or a 13.56 MHz band. Further, the radio wave of the UHF band is advantageously goes round to shadows more easily compared to the radio wave of the 2.4 GHz.

The RFID tag 3 is provided with a radio communication IC (Integrated Circuit) and an antenna. The RFID tag 3 generally does not have a power source such as a battery. A circuit of the RFID tag 3 operates by an electric power supplied by the radio wave from the reader/writer 2 so that the RFID tag 3 performs radio communication with the reader/writer 2.

In this case, the reader/writer 2 needs to transmit through the radio wave the electric power by which the RFID tag 3 separate from the reader/writer 2 for several meters can operate. Thus, the reader/writer 2 has a large transmit output of the radio wave as high as about several watts. Accordingly, the RFID system 1 which transmits the radio wave needs to provide a countermeasure for an EMI (Electro-Magnetic Interference) that reduces the leak from a desired area of the radio wave transmitted from the reader/writer 2. Further, since the transmit output of the radio wave is large, the intensity of a reflected wave obtained by the radio wave transmitted from the reader/writer 2 that reflects on a floor surface 7, a side wall 8 and a ceiling 9 is undesirably high, and an incommunicable region due to a multipath interference of a direct wave and the reflected wave is undesirably generated.

To avoid the above-described problems, in the RFID system 1 of this embodiment, reflection intensity reducing members 6 for reducing the intensity of the reflected wave such as a radio wave absorber for absorbing the radio wave or a diffusive reflection member for diffusing and reflecting the radio wave are provided in the side wall 8 and the ceiling 9 that the radio wave transmitted from the reader/writer 2 reaches. Thus, the leak of the radio wave from the desired area can be reduced and the intensity of the reflected wave can be reduced.

As a material of the radio wave absorber, well-known materials used in the countermeasure for the EMI can be employed. For instance, a resistant film, a composite material of rubber and carbon, fibers adhered with carbon, foamed polystyrene, foamed urethane including carbon, ferrite, a composite material of carbon and ferrite, etc. may be exemplified. Further, as the diffusive reflection member, materials having substantially the same or longer wavelength as that of the radio wave and having shape with uneven surface, or materials having various dielectric constants, etc. may be exemplified.

As described above, since the radio wave, absorber or a radio wave scattering member is composed of a soft material or a material having shape with uneven surface, the radio wave absorber or the radio wave scattering member is undesirably provided on the floor surface 7 on which people move or luggage is conveyed. Thus, the influence of the reflected wave from the floor surface 7 cannot be neglected, and there is a problem of the multipath interference due to the direct wave and the reflected wave from the floor surface 7.

As compared therewith, the reader/writer 2 of this embodiment employs a beam scanning antenna that can perform scanning with the beam of the transmitted radio wave. Thus, since the advancing direction P of the beam can be changed, a communication area can be enlarged compared with the case when an ordinary antenna having high directivity is used. Accordingly, a wide communication area can be covered with the small number of antennas.

Since the scanning direction Sc of the beam changes correspondingly to the advancing direction P of the beam, the scanning with the beam is specified by a plane including the scanning direction Sc. In a case of FIG. 1, the plane including the scanning direction Sc of the beam is a plane parallel to the drawing. In the reader/writer 2 of this embodiment, the scanning with the beam is performed so that the plane including the scanning direction of the beam intersects with the floor surface 7 as a reflecting surface on which the strongest reflected wave is generated.

In this case, the advancing direction P of the beam changes to the floor surface 7 by scanning. Then, the intensity of the radio wave of the direct wave and the intensity of the radio wave of the reflected wave from the floor surface 7 respectively change in an arbitrary position in the communication area.

Figure 2A:
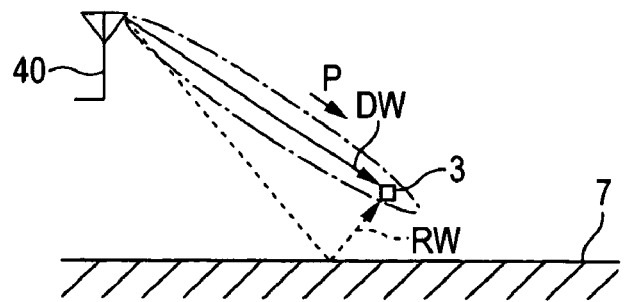
FIGS. 2A to 2C are front views respectively showing a direct wave transmitted to an RFID tag from an antenna of an RFID reader/writer and a reflected wave.
Figure 2B:
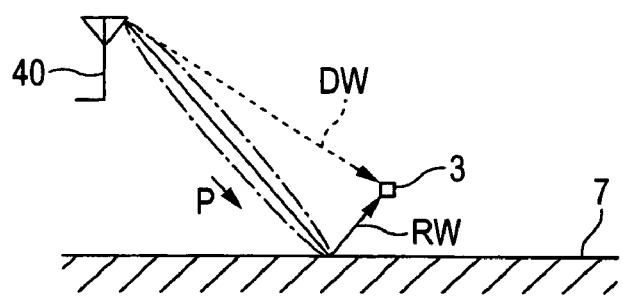
Figure 2C:
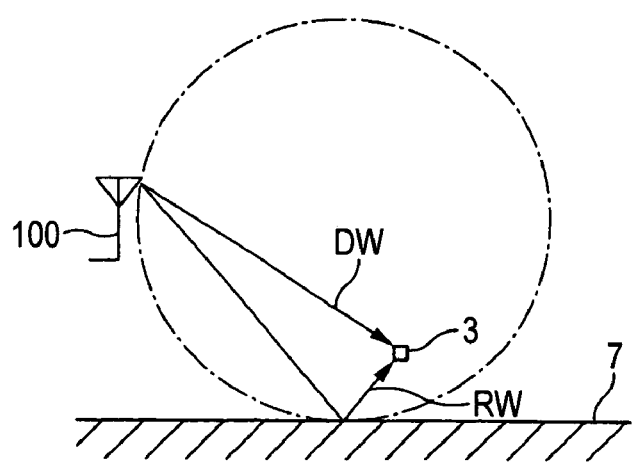

FIGS. 2A to 2C show a direct wave DW directly transmitted from the antenna of the reader/writer 2 to a certain RFID tag 3 and a reflected wave RW transmitted and reflected from the floor surface 7. FIGS. 2A and 2B show cases when the beam scanning antenna 40 of this embodiment is used, and respectively show the cases in which the advancing direction P of the beam differs by the scanning. FIG. 2C shows a case in which an antenna 100 having low directivity of a related art is employed.

In the drawings, when the intensity of the radio wave of the direct wave DW received by the RFID tag 3 is substantially the same as the intensity of the radio wave of the reflected wave RW, the direct wave DW and the reflected wave RW are shown by full lines. On the other hand, when the intensities are different, a radio wave having higher intensity is shown by a full line, and a radio wave having lower intensity is shown by a broken line. Further, the shape of the beam is shown by a dashed line.

Referring to FIGS. 2A to 2C, in the related art, as shown in FIG. 2C, the intensity of the radio wave of the direct wave DW received by the RFID tag 3 is substantially the same as the intensity of the radio wave of the reflected wave RW. Accordingly, when the direct wave DW and the reflected wave RW weaken each other due to the multipath interference, the intensity of the radio wave received by the RFID tag 3 located at an illustrated position is extremely lowered. Thus, the RFID tag 3 is unable to communicate with the reader/writer 2.

On the other hand, as shown in FIG. 2A, when the RFID tag 3 is located in the advancing direction P of the beam by the scanning with the beam, the intensity of the radio wave of the direct wave DW is higher than the intensity of the radio wave of the reflected wave RW. Accordingly, even when the direct wave DW and the reflected wave RW weaken each other due to the multipath interference, the intensity of the radio wave of the direct wave DW received by the RFID tag 3 located at an illustrated position is not particularly lowered. Thus, the RFID tag 3 can communicate with the reader/writer 2.

Further, as shown in FIG. 2B, when the advancing direction P of the beam is located at a lower position than that shown in FIG. 2A by the scanning with the beam, and a symmetrical position of the RFID tag 3 with respect to the floor surface 7 is located in the advancing direction P of the beam, the intensity of the radio wave of the reflected wave RW is higher than the intensity of the radio wave of the direct wave DW. Accordingly, even when the direct wave DW and the reflected wave RW weaken each other due to the multipath interference, the intensity of the radio wave of the reflected wave RW received by the RFID tag 3 located at an illustrated position is not particularly lowered. Thus, the RFID tag 3 can communicate with the reader/writer 2.

As described above, in an incommunicable region due to the multipath interference, when the intensity of the radio wave of the direct wave differs from the intensity of the radio wave of the reflected wave from the floor surface 7, the multipath interference is suppressed and the reader/writer 2 can communicate with the RFID tag 3. Therefore, the wide communication area having no incommunicable region can be covered. Further, in this embodiment, the antenna of the reader/writer 2 and a control thereof may only be changed, and the RFID tag 3 does not need to be changed particularly.

Now, the specific configurations of the reader/writer 2 and the RFID tag 3 will be described by referring to FIGS. 3 to 11.

Figure 3:
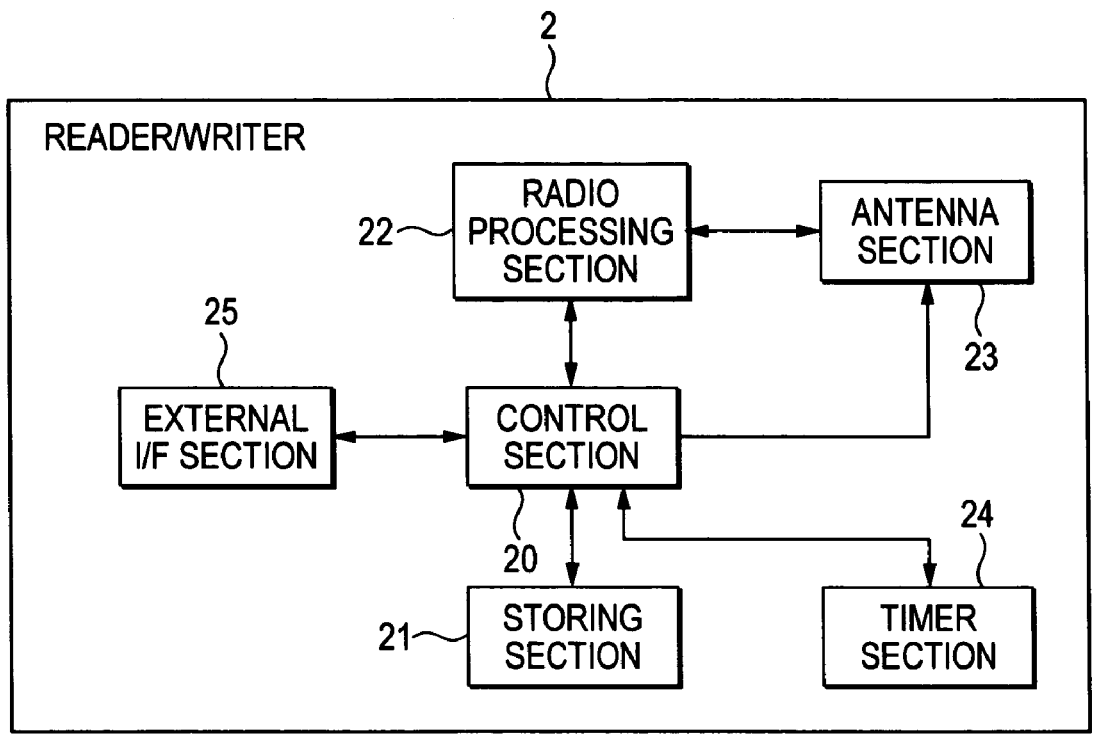
FIG. 3 is a block diagram showing the schematic configuration of the RFID reader/writer in the RFID system.

FIG. 3 shows a schematic configuration of the reader/writer 2. As shown in FIG. 3, the reader/writer 2 includes a control section 20, a storing section 21, a radio processing section (a communication section) 22, an antenna section (an antenna for tag communication), a timer section 24 and an external I/F (interface) section 25.

The control section 20 entirely controls operations of various kinds of the above-described configurations in the reader/writer 2. The control section 20 is constituted with a computer of, for instance, a PC (personal Computer) base. Then, the operations of the various kinds of the configurations are controlled by executing a control program in the computer. This program, for example, may have a configuration in which the program recorded in a removable media such as a CD-ROM is read and used, or a configuration in which the program installed in a hard disk is read and used. Further, a configuration may be considered in which the above-described program is downloaded through the external I/F section 25 and installed in a hard disk to be executed.

The storing section 21 is constituted with a nonvolatile storage device such as the hard disk. As contents stored in the storing section 21, the control program, an OS (operating system) program and other various kinds of programs and various kinds of data may be exemplified. In this embodiment, in the storing section 21, the data such as the scanning range, the incrementing angle and the holding time of an antenna in the antenna section 23 is stored.

The radio processing section 22 converts the data received from the control section 20 to a format suitable for a radio transmission, and transmits the converted radio signal to an external device through the antenna section 23. Further, the radio processing section 22 converts the radio signal received from the external device through the antenna section 23 to the original format, and transmits the converted data to the control section 20. As the radio processing section 22, an A/D (Analog to Digital) converting circuit, a D/A (Digital to Analog) converting circuit, a modulation and demodulation circuit, an RF (radio frequency) circuit or the like may be used.

The antenna section 23 converts the radio signal from the radio processing section 22 to the radio wave, and transmits the radio wave to the external device. Further, the antenna section 23 converts the radio wave received from the external device to the radio signal, and transmits the radio signal to the radio processing section 22. As the antenna section 23, an antenna, a resonance circuit or the like is employed. In this embodiment, the antenna section 23 is the beam scanning antenna that can perform scanning with beam in direction of the radio wave transmitted to the external device. The detail of the beam scanning antenna will be described below.

The timer section 24 measures various kinds of time in accordance with an instruction from the control section 20, and transmits the measured time data to the control section 20. In this embodiment, the timer section 24 is used to adjust the beam direction of the radio wave transmitted from the antenna section 23.

The external I/F section 25 communicates with an external device such as a PC. As the interface standard of the external I/F section 25, USB (Universal Serial Bus), IEEE1394, Ethernet (registered trademark), etc. may be exemplified.

Figure 4:
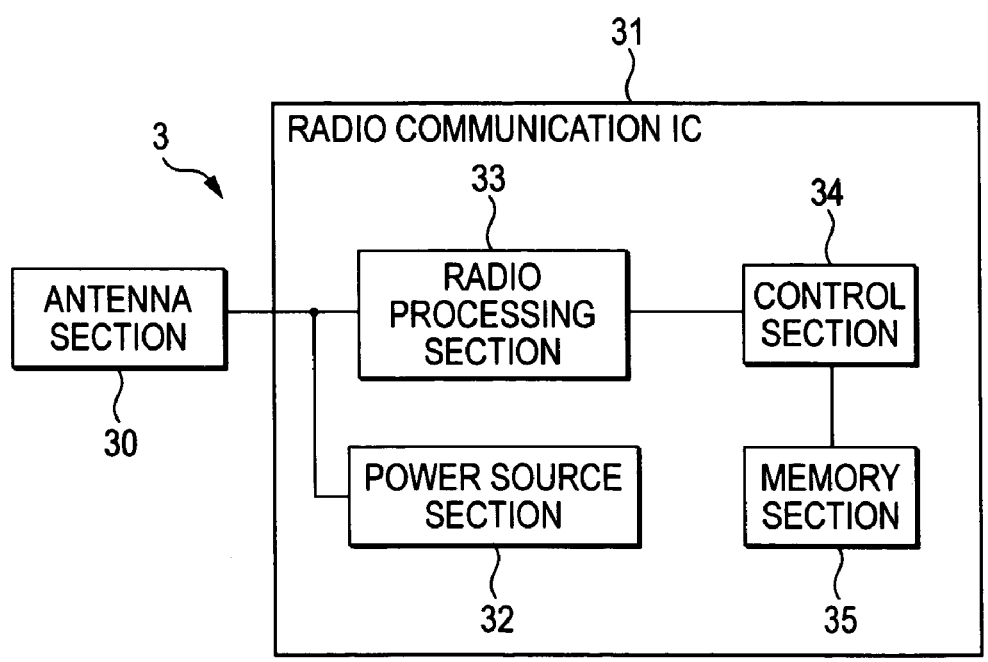
FIG. 4 is a block diagram showing the schematic configuration of the RFID tag in the RFID system.

FIG. 4 shows a schematic configuration of the RFID tag 3. As shown in the drawing, the RFID tag 3 is constituted with an antenna section 30 and a radio communication IC 31.

The antenna section 30 serves to receive the radio wave from the reader/writer 2 as an electric power source for operating the radio communication IC 31. Further, the antenna section 30 converts the radio wave received from the reader/writer 2 to a radio signal, and transmits the radio signal to the radio communication IC 31. Further, the antenna section 30 converts the radio signal from the radio communication IC 31 to the radio wave, and transmits the radio wave to the reader/writer 2. As the antenna section 30, an antenna, a resonance circuit, etc. may be used.

The radio communication IC 31 stores data from the reader/writer 2 or transmits the stored data to the reader/writer 2 through the antenna section 30 based on the signal received from the reader/writer 2 through the antenna section 30. As shown in FIG. 4, the radio communication IC 31 is constituted with a power source section 32, a radio processing section 33, a control section 34 and a memory section 35.

The power source section 32 serves to rectify induced voltage generated when the antenna section 30 receives the radio wave with a rectifying circuit. Then, after adjusting the voltage to a desired voltage in a power circuit, the power source section 32 supplies the voltage to each section of the radio communication IC 31. As the power source section 32, a bridge diode, a voltage adjusting condenser, etc. are used.

The radio processing section 33 converts the radio signal received from the external device through the antenna section 30 to the original format, and transmits the converted data to the control section 34. Further, the radio processing section 33 converts data received from the control section 34 to a format suitable for radio transmission, and transmits the converted radio signal to the external device through the antenna section 30. As the radio processing section 33, an A/D (Analog to Digital) converting circuit, a D/A (Digital to Analog) converting circuit, a modulation and demodulation circuit, an RF circuit, or the like is employed.

The control section 34 entirely controls the operations of the various kinds of configurations in the radio communication IC 31. The control section 34 is constituted with a logic operation circuit, a register, etc., and functions as a computer. The operations of the various kinds of the configurations are controlled by executing a control program in the computer. This program may have, for instance, a configuration in which a program installed in a ROM (Read Only Memory) of the memory section 35, etc. is read and used, or a configuration in which the program is downloaded from the reader/writer 2 through the antenna section 30 and the radio processing section 33, and installed in the memory section 35 to be executed.

Especially, the control section 34 stores the data from the reader/writer 2 in the memory section 35 based on the data received from the reader/writer 2 through the antenna section 30 and the radio processing section 33. Further, the control section 34 reads the data stored in the memory section 35, and transmits the data to the reader/writer 2 through the radio processing section 33 and the antenna section 30.

The memory section 35 is constituted with a semiconductor memory such as the ROM, a SRAM (static RAM), a FeRAM (a ferroelectric memory). As contents stored in the memory section 35, the control program, other various kinds of programs and various kinds of data may be exemplified. Since the radio communication IC 31 uses the radio wave transmitted from the reader/writer 2 as a power source, a nonvolatile memory such as the ROM or a memory such as the SRAM and the FeRAM having less electric power consumption is desirably employed.

Now, the beam scanning antenna used in the antenna section 23 of the reader/writer 2 will be described by referring to FIGS. 5 to 7. As the beam scanning antenna that can perform scanning with the beam in the beam direction of the radio wave transmitted to an external device, for instance, a system in which an antenna itself is oscillated, a system in which a plurality of antennas having different beam directions are used for switching, and a system in which a phase shifter is used may be exemplified as described in JP-A-2002-198722.

In the system in which the antenna itself is oscillated among the above-described systems, since a mechanical driving unit is necessary, the scale of an apparatus is enlarged and a periodic maintenance is required. Further, in the system in which the plurality of antennas are used for switching, the mechanical driving unit is not necessary. However, since all the antennas are not used at the same time, the usability of the antennas is low. As compared with these systems, the system in which the phase shifter is used is excellent at the point that the usability of the antennas is high since all the antennas are used at the same time, and the point that the mechanical driving unit is not necessary.

Thus, in this embodiment, a patch antenna using the phase shifter is used as the beam scanning antenna. The patch antenna is one kind of a plane antenna, and is constituted with a plurality of patch type conductors functioning as antenna elements and a dielectric member.

Figure 5:
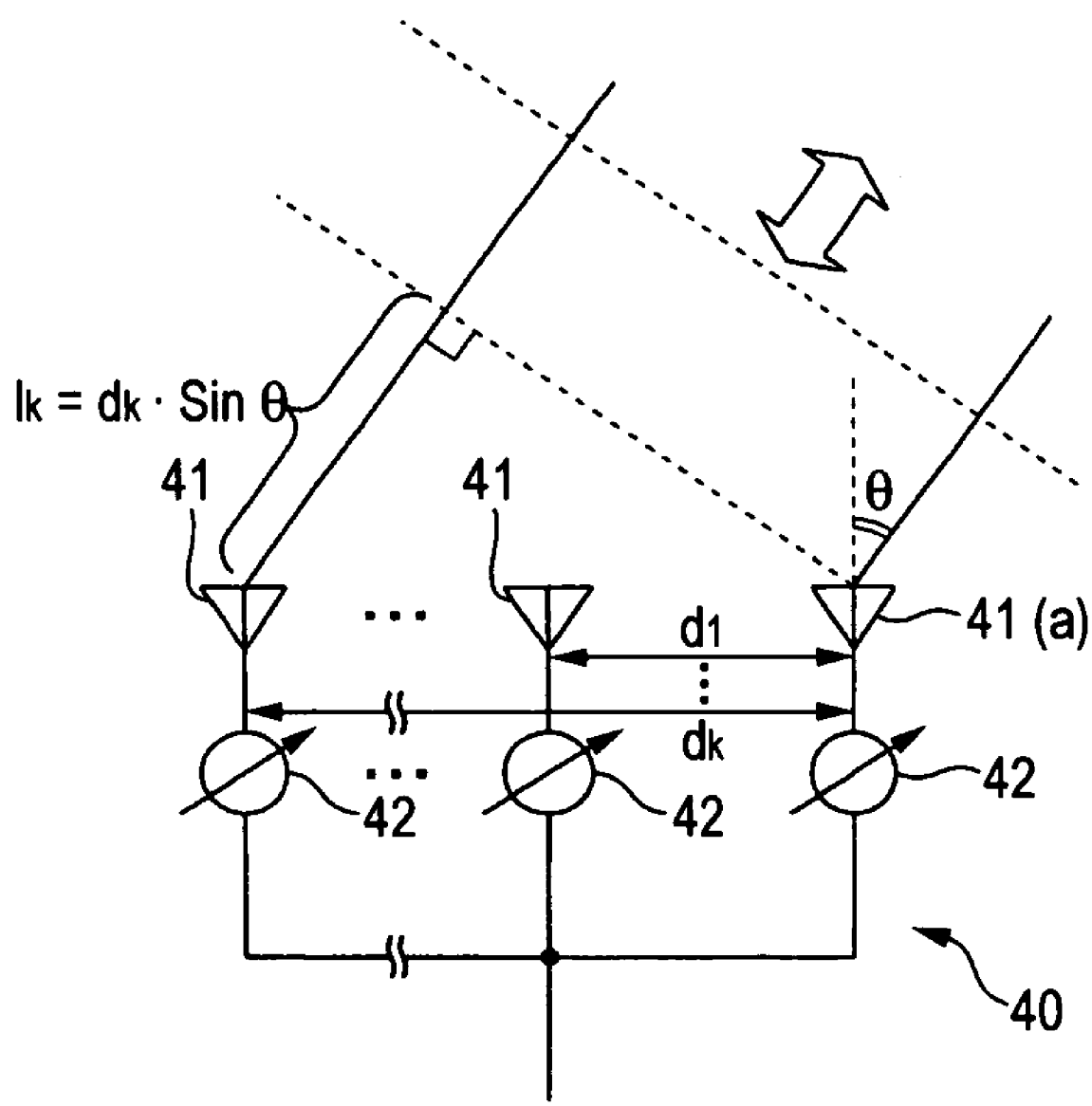
FIG. 5 is a schematic view showing the outline of a beam scanning antenna using a phase shifter provided in the RFID system.

FIG. 5 shows a schematic view of the beam scanning antenna using the phase shifter. In the beam scanning antenna 40, a plurality of antenna elements 41 are arranged and a variable phase shifter (phase shifter) 42 is connected to each of the antenna elements 41.

When all the antenna elements 41 respectively transmit the radio wave with the same phase, the radio wave is transmitted as a plane wave in the direction perpendicular to the direction in which the antenna elements 41 are arranged. On the other hand, in order to incline the transmitting direction of the radio wave by an angle of $\theta$ (rad) from the direction perpendicular to the direction in which the antenna elements 41 are arranged, the phase of the radio wave transmitted from each of the antenna elements 41 may be shifted as described below.

Specifically, as shown in FIG. 5, assuming that a wavelength of the radio wave to be transmitted or received is $\lambda$(m), a distance between an antenna element 41a as a base and the k-th antenna element 41 is dk(m), and a distance between an equiphase wave surface passing the base antenna element 41a among equiphase wave surfaces shown by broken lines in FIG. 5 and the k-th antenna element 41 is lk (m), the shift $\Phi k$ of the phase of the k-th antenna element 41 with respect to the phase of the base antenna element 41a is expressed by a below-described formula.

$$\Phi k = (lk/\lambda)*2\pi = (dk*\sin\theta/\lambda)*2\pi \qquad \text{[Expression 1]}$$

As described above, in the beam scanning antenna using the phase shifter, the variable phase shifters 42 respectively shift the phases of signals so as to satisfy the above-described formula. Accordingly, the beam of the radio wave can be directed to a desired direction. On the other hand, when the radio wave is received, the phase shift of each of the antenna elements 41 is detected so that the direction of the received radio wave can be determined.

Figure 6A:
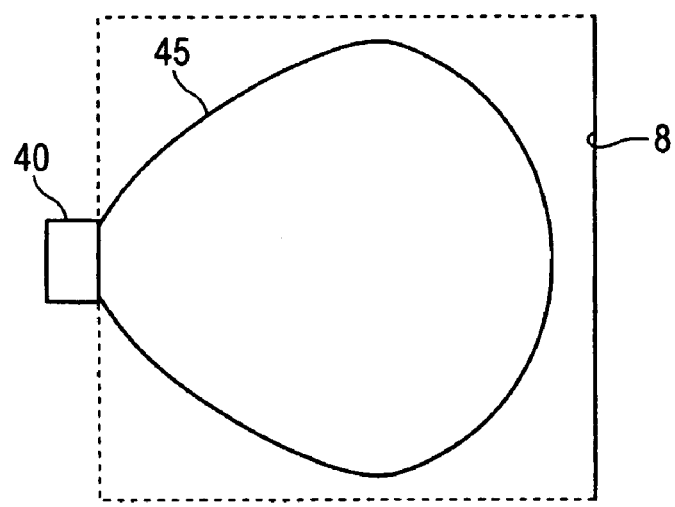
FIGS. 6A to 6C respectively show a beam shape of a radio wave transmitted from the beam scanning antenna.
Figure 6B:
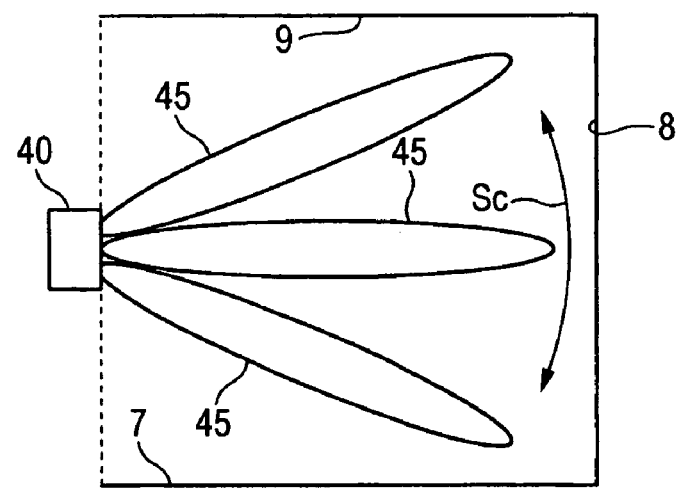
Figure 6C:
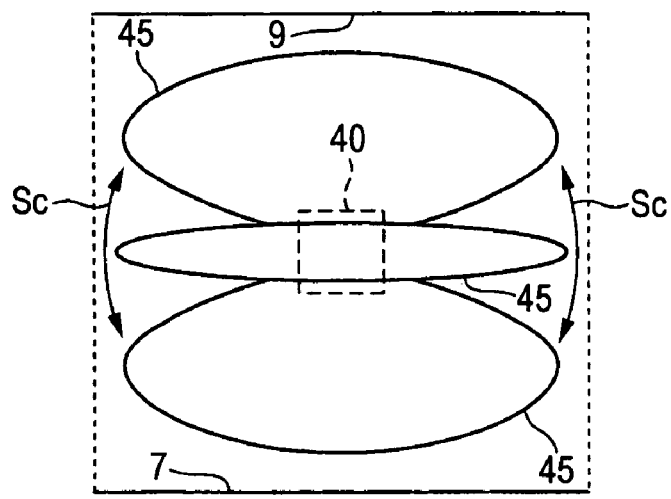

FIGS. 6A to 6C respectively show a beam shape 45 of the radio wave transmitted from the beam scanning antenna 40. FIG. 6A is a plan view. FIG. 6B is a front view. FIG. 6C is a side view looking from a side opposed to the beam scanning antenna 40. FIGS. 6B and 6C show aspects that the beam shape 45 changes by scanning.

Figure 13:
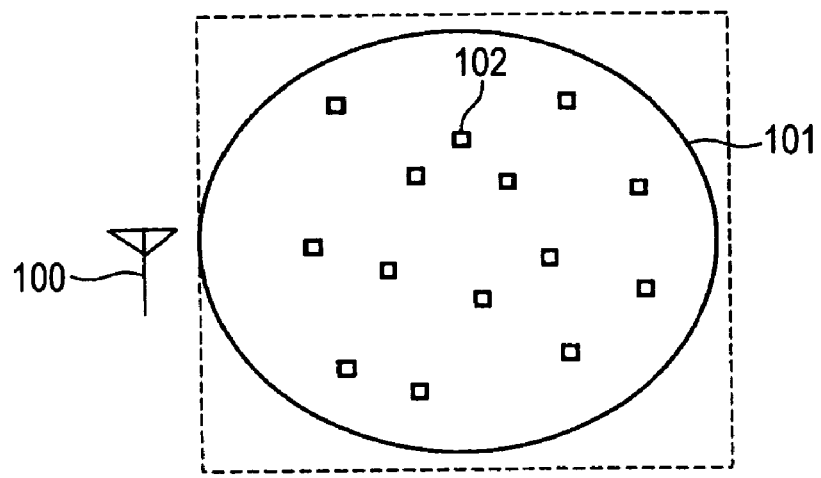
FIG. 13 is a side view showing an area in which an RFID reader/writer can communicate with an RFID tag when the RFID reader/writer uses an antenna having low directivity.
Figure 14:
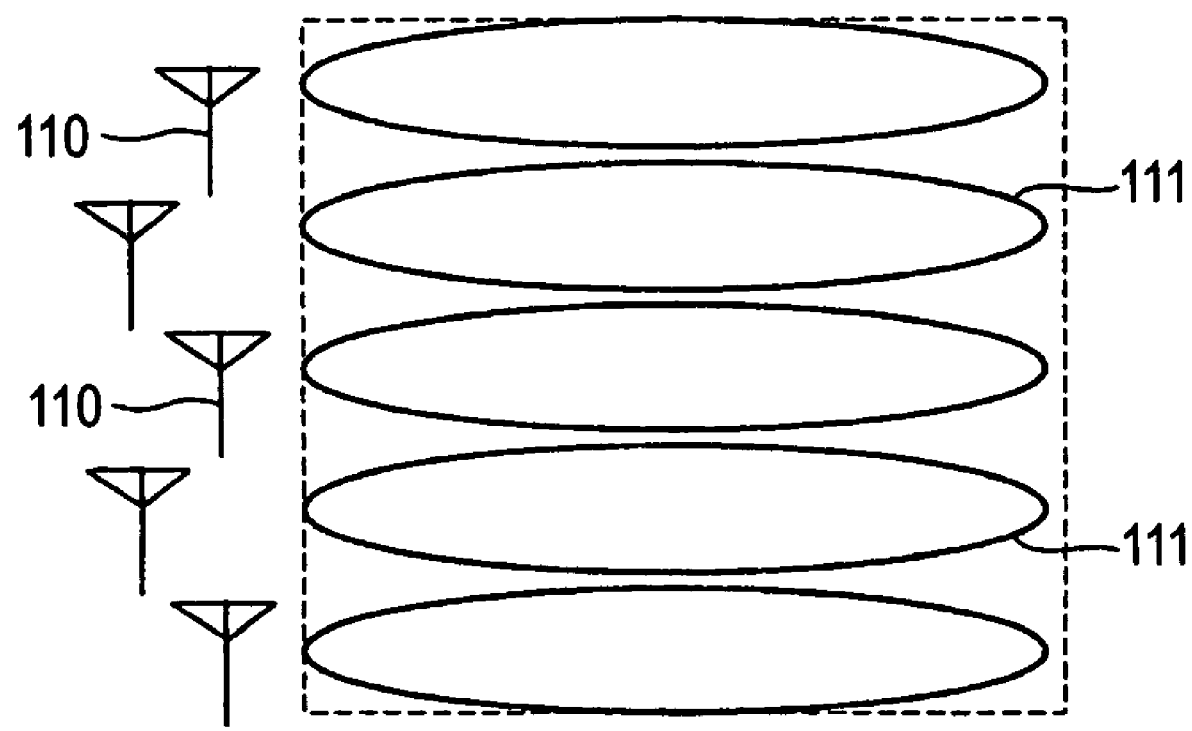
FIG. 14 is a side view showing a communication area in which an RFID reader writer can communicate with an RFID tag when the RFID reader/writer uses an antenna having high directivity.

As shown in FIGS. 6A to 6C, the beam shape 45 transmitted from the beam scanning antenna 40 of this embodiment is narrow in the scanning direction Sc and wide in other directions. That is, the beam has high directivity in the scanning direction Sc and low directivity in other directions. Since the beam shape 45 is wide in directions other than the scanning direction Sc, a wide communication area substantially equal to that of the beam having low directivity as shown in FIG. 13 can be ensured just with a single scanning.

FIGS. 7A to 7D respectively show a distribution of a communication area in which the reader/writer 2 can communicate with the RFID tag 3 and an incommunicable area in which the reader/writer 2 cannot communicate with the RFID tag 3, in an area having the width of 2.5 meters and the height of 2.5 meters. In the drawing, the radio wave is transmitted rightward from a spot of a left end (x=−1.25 m) and a height (H) of 1.25 m. Further, a white area shows the communication area, a black area shows the incommunicable area, and a gray area shows an area in which a communication is unstable.

Figure 7A:
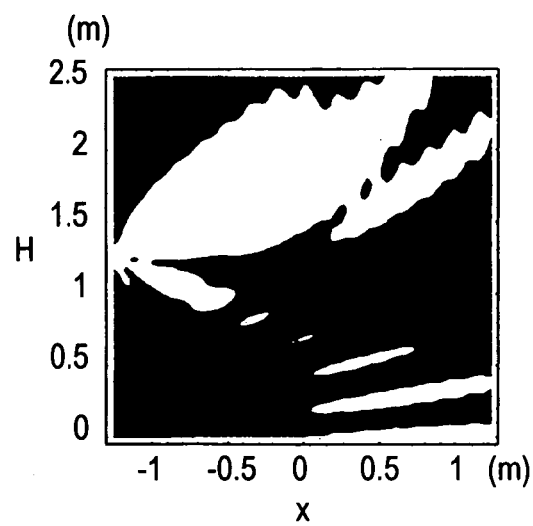
FIGS. 7A to 7D are graphs respectively showing a distribution of a communication area of the RFID reader/writer and the RFID tag.
Figure 7C:
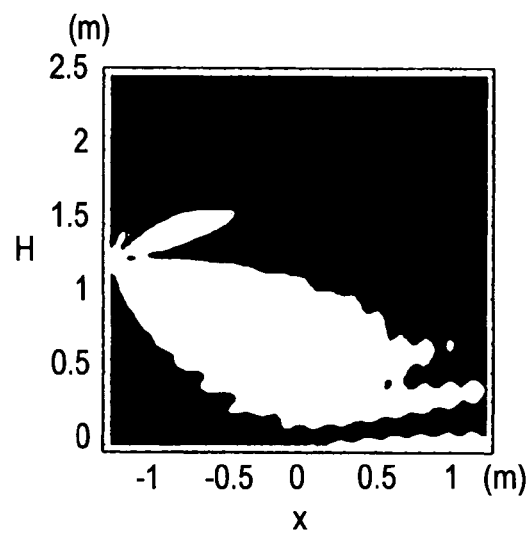
Figure 7B:
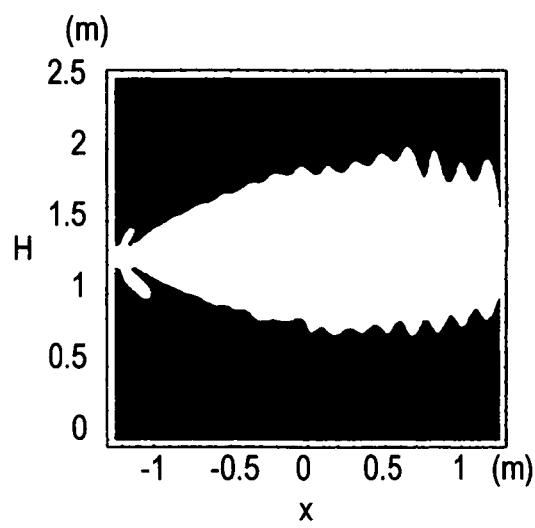
Figure 7D:
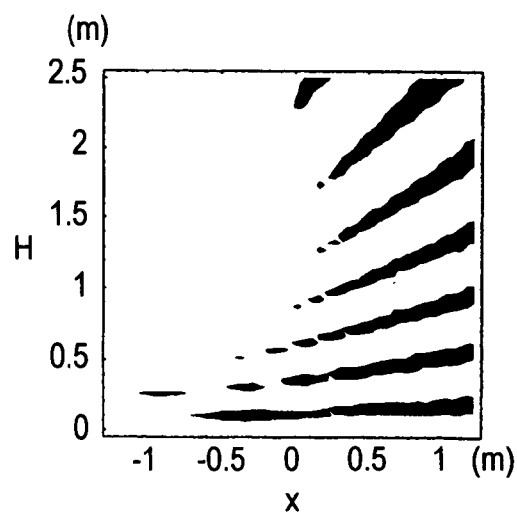

FIGS. 7A to 7C correspond to FIG. 6B, and show the distributions of the communication areas when the beam scanning antenna 40 of this embodiment is used. FIG. 7D shows the distribution of the communication area when the antenna 100 of the related art having low directivity is used as a comparative example. Further, FIGS. 7A to 7C show the distributions of the communication areas when the radio wave is transmitted in the direction of obliquely upward, in the horizontal direction and in the direction of obliquely downward, respectively.

As shown in FIG. 7D, when the radio wave is transmitted from the antenna having low directivity, the wide communication area is obtained. However, a number of incommunicable regions are generated particularly in the low positions. On the contrary, as shown in FIGS. 7A to 7C, when the radio wave is transmitted from the antenna having high directivity, the communication area is narrow. However, the communication area can be ensured in the advancing direction of the beam of the radio wave. Accordingly, when the scanning with the beam of the radio wave is performed as in this embodiment, the communication areas shown in FIGS. 7A to 7C can be superimposed to eliminate the incommunicable area.

Comparing FIG. 7B with FIGS. 7A and 7C, when the beam of the radio wave is transmitted in the horizontal direction, it can be understood that a good communication area corresponding to the advancing direction of the beam of the radio wave is obtained. This phenomenon is considered to arise because of a reason described below. The radio wave is transmitted in the direction parallel to the floor surface 7 on which the reflection intensity reducing member 6 is not provided, that is, a surface on which the influence by the reflected wave is most liable to appear, so that the influence due to the multipath interference can be suppressed. Therefore, the advancing direction of the beam of the radio wave preferably includes the direction parallel to the surface on which the influence by the reflected wave is most liable to be generated.

Further, as shown in FIG. 6B and FIGS. 7A to 7C, the antenna is desirably located separately from the floor surface. A distance between the antenna and the floor surface is desirably determined when the advancing direction of the beam of the transmitted radio wave is directed to the floor surface as shown in 7C. The distance is desirably determined based on an angle between the advancing direction of the beam and the floor surface, a space necessary for reading the RFID tag 3 and that no incommunicable region exists in the necessary space. In this case, the space in which the generation of the incommunicable region is suppressed can be ensured in the part between the antenna and the floor surface, so that a communication with a number of RFID tags 3 passing this space can be achieved accurately.

Now, an adjustment of scanning of the radio wave from the reader/writer 2 will be described with reference to FIGS. 8 to 10. The reader/writer 2 of this embodiment has a function of adjusting and optimizing a scanning range showing the range of the transmitting direction (advancing direction) of the radio wave, an increment angle of the transmitting direction and a holding time for holding the transmission of the radio wave in a certain transmitting direction, so that the reader/writer 2 can communicate with substantially all the RFID tags 3 in a desired time.

Figure 8:
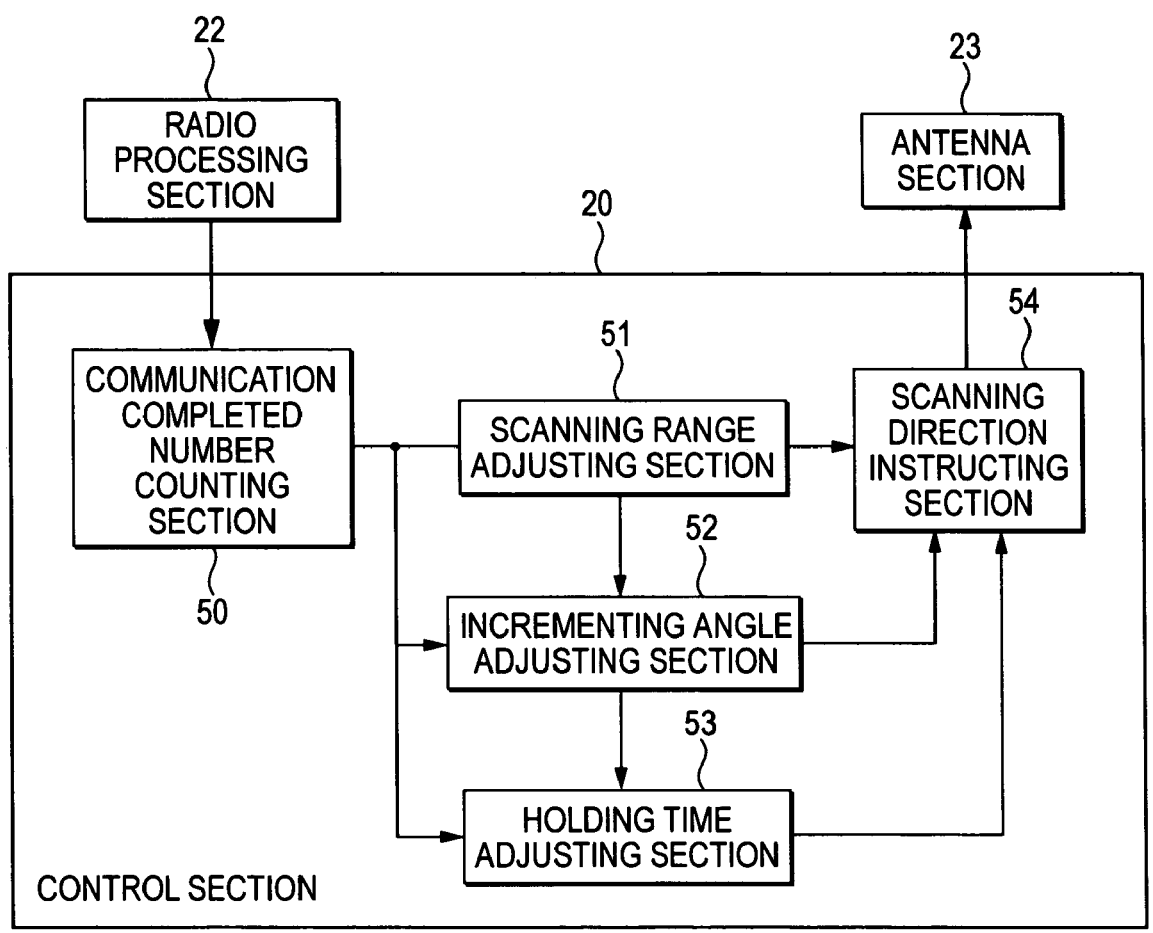
FIG. 8 is a block diagram showing a functional configuration for adjusting the scanning operation of the beam of the transmitted radio wave in a control section of the RFID reader/writer.
Figure 9A:
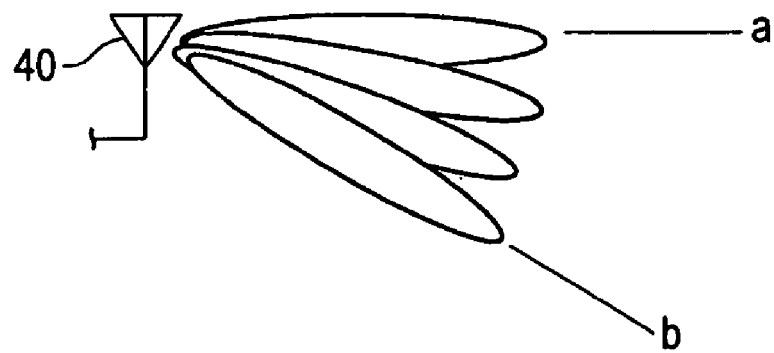
FIGS. 9A to 9C are diagrams respectively showing the contents of the adjustment of a scanning range, an incrementing angle and a holding time related to the adjustment of the scanning.
Figure 9B:
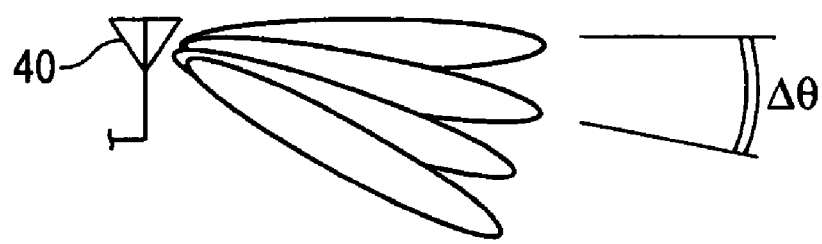
Figure 9C:

FIG. 8 shows a functional block for adjusting the transmitting direction of the radio wave in the control section 20 of the reader/writer 2. As shown in the drawing, the control section 20 is constituted with a communication completed number counting section (counting section) 50, a scanning range adjusting section (scanning adjusting section) 51, an incrementing angle adjusting section (scanning adjusting section) 52, a holding time adjusting section (scanning adjusting section) 53 and a scanning direction instructing section (a scanning control section) 54. FIGS. 9A to 9C respectively show an adjustment of the transmitting direction of the radio wave in the scanning range adjusting section 51, the incrementing angle adjusting section 52 and the holding time adjusting section 53.

The communication completed number counting section 50 receives the information of the RFID tag 3 that performs and normally completes the radio communication from the radio processing section 22 to count the number of the RFID tags 3 that complete the communication. The communication completed number counting section 50 transmits the counting information of the RFID tags 3 that complete the communication to the scanning range adjusting section 51, the incrementing angle adjusting section 52 and the holding time adjusting section 53.

The scanning direction instructing section 54 controls the antenna section 23 based on an instruction of the transmitting direction θ of the radio wave received from the scanning range adjusting section 51, the incrementing angle adjusting section 52 and the holding time adjusting section 53. Specifically, the scanning direction instructing section 54 calculates the phase Φk of the radio wave transmitted from each of the antenna elements 41 shown in FIG. 5 based on the above-described expression 1 according to the instruction of the transmitting direction θ of the radio wave, and transmits the calculated phase Φk to each of the variable phase shifters 42 of the antenna section 23.

The scanning range adjusting section 51 adjusts a scanning start angle a (rad) and a scanning end angle b (rad) with respect to the transmitting direction of the radio wave as shown in FIG. 9A. Further, the scanning range adjusting section 51 stores the scanning start angle a and the scanning end angle b which are adjusted in the storing section 21, and uses the angles in the actual operation. As a base direction of the angle, an arbitrary direction such as a horizontal direction or a vertical direction can be selected.

Specifically, the scanning range adjusting section 51 firstly instructs the scanning direction instructing section 54 to perform a single scanning at a certain scanning start angle a and a certain scanning end angle b, at a certain incrementing angle Δθ (rad) and for a certain scanning time T(s). Then, the scanning range adjusting section obtains the number of the RFID tags 3 that complete the communication in the certain scanning time T from the communication completed number counting section 50. Then, these operations are repeated by changing the scanning start angle a and the scanning end angle b in various ways. Thus, the scanning range adjusting section 51 determines the scanning start angle a and the scanning end angle b at which the largest number of the RFID tags 3 that complete the communication in the single scanning is obtained.

The incrementing angle adjusting section 52 adjusts the incrementing angle Δθ showing a quantity of change when the transmitting direction of the radio wave is changed as shown in FIG. 9B. Further, the incrementing angle adjusting section 52 stores the adjusted incrementing angle Δθ in the storing section 21, and uses the incrementing angle in the actual operation.

Specifically, the incrementing angle adjusting section 52 firstly instructs the scanning direction instructing section 54 to perform a single scanning at the scanning start angle a and the scanning end angle b determined by the scanning range adjusting section 51, at the certain incrementing angle Δθ and for a certain scanning time T. Then, the incrementing angle adjusting section obtains the number of the RFID tags 3 that complete the communication in the certain scanning time T from the communication completed number counting section 50. Then, these operations are repeated by changing the incrementing angle Δθ in various ways. Thus, the incrementing angle adjusting section determines the incrementing angle AO at which the largest number of the RFID tags 3 that complete the communication in the single scanning is obtained.

The holding time adjusting section 53 adjusts a holding time t(s) for holding the transmission of the radio wave to a certain direction as shown in FIG. 9C. Further, the holding time adjusting section 53 stores the adjusted holding time t in the storing section 21, and uses the holding time in the actual operation.

Specifically, the holding time adjusting section 53 firstly instructs the scanning direction instructing section 54 to perform a single scanning at the scanning start angle a and the scanning end angle b determined in the scanning range adjusting section 51, at the incrementing angle Δθ (rad) determined in the incrementing angle adjusting section 52 and for a certain holding time t. Then, the holding time adjusting section 53 obtains the number of the RFID tags 3 that complete the communication in the single scanning from the communication completed number counting section 50. Then, these operations are repeated by changing the holding time t in various ways. Thus, the holding time adjusting section 53 determines the holding time t for which the largest number of the RFID tags 3 that complete the communication in the single scanning is obtained.

Figure 10:
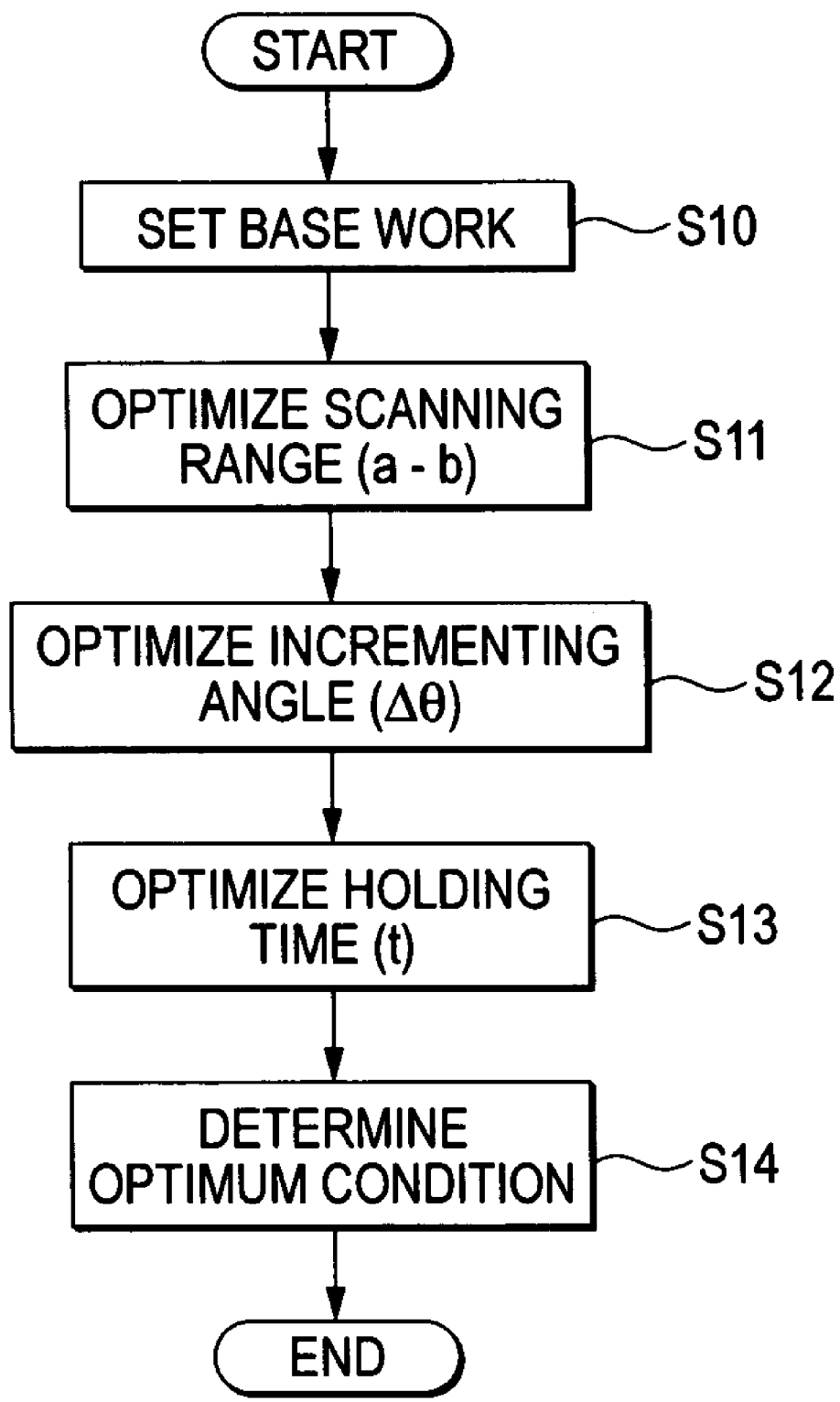
FIG. 10 is a flowchart showing the flow of processes of the adjustment of the scanning.

FIG. 10 shows a flow of processes for adjusting the transmitting direction of the radio wave from the reader/writer 2 in the RFID system 1 having the above-described configuration. This adjustment is carried out in accordance with an operating state of a practical use.

Initially, a base work is set (step S10, which may be simply described as "S10", hereinafter. This is applied to other steps.). Specifically, for instance, a case is considered in which a luggage for flight is identified automatically and contactless. Initially, the RFID tags 3 are respectively attached to the works 4 such as a suitcase, a shipping carton, etc. that are actually conveyed on the belt conveyor as the conveying device 5. On the other hand, in the reader/writer 2, the antenna is installed in a suitable place to allow the peripheral environment of the antenna to be the same as that during a practical use. Then, the works 4 having the RFID tags 3 are actually conveyed on the conveyor 5 at an actual conveying speed so that a certain number of the works 4 pass the communication area with the reader/writer 2 in a certain time T.

Then, the scanning range adjusting section 51 performs the above-described adjusting operation to optimize the scanning range a to b (S11). The incrementing angle adjusting section 52 performs the above-described adjusting operation to optimize the incrementing angle Δθ (S12). The holding time adjusting section 53 performs the above-described adjusting operation to optimize the holding time t (S13).

In such a way, the condition of an optimum scanning operation is determined, and the condition is stored in the storing section 21 as an initial condition and employed for a practical use.

Accordingly, in this embodiment, since the condition of the optimum scanning operation is automatically determined, the antenna can be easily tuned so as to obtain a desired area as the communication area upon performing the initial setting when the antenna is installed or in a time of maintenance. Further, not only upon performing the initial setting or in the time of maintenance, but also upon practical use, the antenna can be suitably tuned.

A sequence of the adjusting operations of the scanning range a to b, the incrementing angle Δθ and the holding time t can be changed in various ways. Further, the certain time T may be adjusted in place of adjusting the holding time t.

Figure 11A:
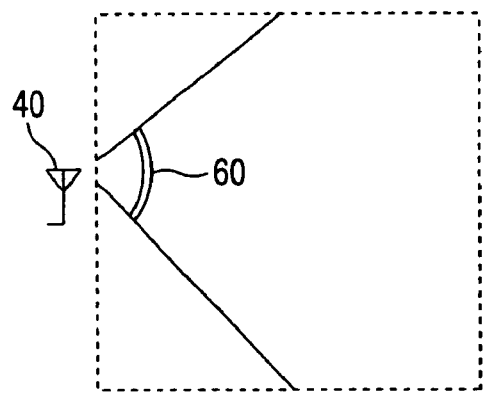
FIGS. 11A to 11C are front views respectively showing the scanning range of the radio wave transmitted from the beam scanning antenna of the RFID reader/writer.
Figure 11B:
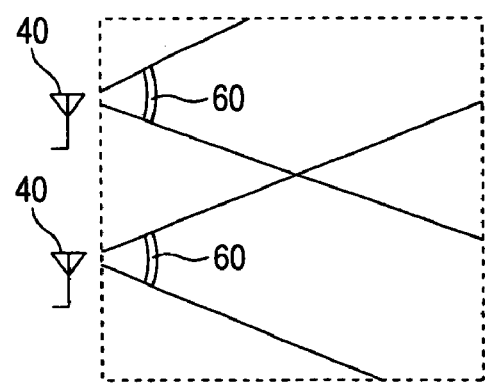
Figure 11C:
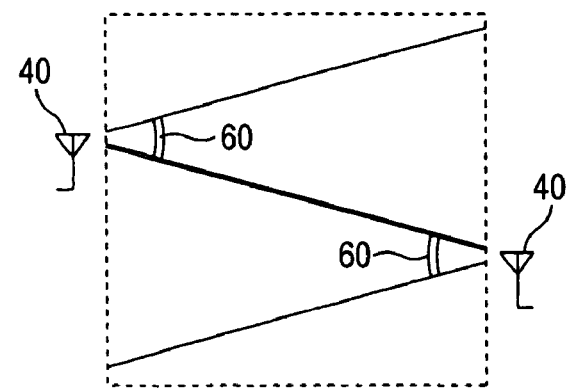

Now, the number of the beam scanning antennas 40 and the installed positions of the beam scanning antennas 40 used in the reader/writer 2 will be described by referring to FIG. 11. FIGS. 11A to 11C show the scanning range of the radio wave transmitted from the beam scanning antenna 40 of the reader/writer 2. FIG. 11A shows a case in which only one beam scanning antenna 40 is provided. FIG. 11B shows a case in which two beam scanning antennas 40 are provided in the vertical direction. FIG. 11C shows a case in which two beam scanning antennas 40 are provided to be opposed to each other and shifted in the vertical direction.

FIG. 11A is compared with FIGS. 11B and 11C. When the single beam scanning antenna 40 is provided, as the scanning range 60 is wide, it takes a long time for performing a single scanning. Further, since a downward inclination is large, an angle between the transmitting direction of the radio wave and the floor surface 7 is large. Thus, the reflected wave reflecting on the floor surface 7 expands in the rearward (a right side in the drawing) so that the multipath interference may be possibly increased.

As compared therewith, when the two beam scanning antennas 40 are provided in the vertical direction as shown in FIGS. 11B and 11C, since the scanning range 60 is narrow, it takes a short time for performing a single scanning. Further, since the downward inclination is small, the transmitting direction of the radio wave from the upper beam scanning antenna 40 does not intersect with the floor surface. Thus, the multipath interference can be prevented. Further, since the angle between the transmitting direction of the radio wave and the floor surface is small in the lower beam scanning antenna 40, the reflected wave reflecting on the floor surface does not particularly expands in the rearward. Thus, the multipath interference can be suppressed.

Accordingly, the reader/writer 2 desirably uses a plurality of beam scanning antennas 40. In order to suppress the multipath interference due to the reflected wave from the floor surface, the reader/writer 2 is desirably provided with the plurality of the beam scanning antennas 40 in the vertical direction, that is, in the direction perpendicular to the floor surface.

As can be understood from FIGS. 11A to 11C, the communication area in which the reader/writer 2 can communicate with the RFID tag 3 through the beam scanning antenna 40 is narrow in an area near the beam scanning antennas 40 and wide in an area remote from the beam scanning antenna 40. Accordingly, as shown in FIGS. 11A and 11B, there is a possibility that an area exists that the beam does not reach even when the scanning is performed in the area near the beam scanning antenna 40. Thus, this area may possibly be an in communicable area. Further, as shown in FIG. 11B, in the area remote from the beam scanning antenna 40, an area may exist where the communication areas of the beam scanning antennas 40 may possibly overlap on each other. In the area, interference may occur.

Thus, as shown in FIG. 11C, the plurality of the beam scanning antennas 40 are desirably disposed to be opposed to each other. In this case, an area near the one beam scanning antenna 40 becomes the communication area of the beam scanning antenna 40 opposed thereto. Thus, the generation of the incommunicable area can be prevented. Further, when the beam scanning antennas 40 opposed to each other are arranged so as to be shifted in the direction substantially perpendicular to the floor surface 7, the area where the communication areas thereof overlap on each other is reduced as shown in FIG. 11C. Thus, the radio waves from the plurality of the beam scanning antennas 40 can be prevented from interfering.

The present invention is not limited to the above-described embodiment and various changes may be made within a scope defined in claims. That is, embodiments obtained by combining technical means suitably changed within the scope defined in claims may be included in the technical scope of the present invention.

For instance, in the above-described embodiment, the reader/writer 2 reads and writes information with respect to the RFID tag 3. However, the reader/writer 2 may have only a function of a reader for reading the information from the RFID tag 3, or only a function of a writer for writing the information on the RFID tag 3. Further, the reader/writer 2 may receive the radio wave transmitted from the RFID tag 3 by the beam scanning antenna, or may receive the radio wave by a separately provided antenna.

Further, in the above-described embodiment, the advancing direction of the beam of the transmitted radio wave is changed to the direction perpendicular to the floor surface. However, when the reflecting surface on which the strongest reflected wave is generated is the side wall 8, the advancing direction of the beam of the radio wave is desirably changed to the direction perpendicular to the side wall 8. In such a way, a plane including the advancing direction of the beam of the transmitted radio wave is desirably substantially perpendicular to the reflecting surface.

Figure 12:
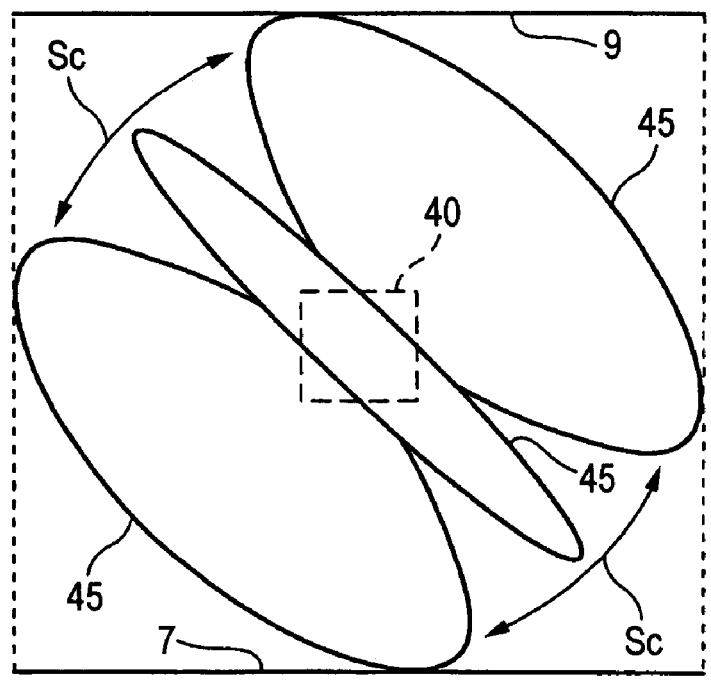
FIG. 12 is a side view showing that another beam shape of the radio wave transmitted from the beam scanning antenna is looked from a side opposed to the beam scanning antenna, and a plane including a scanning direction is inclined by 45 degrees from a floor surface.

Further, in the above-described embodiment, the plane including the scanning direction Sc is perpendicular to the floor surface 7 as shown in FIG. 6. However, an arbitrary plane other than a plane parallel to the floor surface 7, that is, any of planes intersecting with the floor surface 7 may be selected. For instance, FIG. 12 corresponds to FIG. 6C and shows a case in which the plane including the scanning direction Sc is inclined by 45 degrees from the floor surface 7. In this case, the intensity of the radio wave of the direct wave and the intensity of the radio wave of the reflected wave change. Thus, the generation of the incommunicable area due to the multipath interference can be suppressed.

Further, as shown in FIGS. 2A and 2B, when the beam is narrowed down in the direction perpendicular to the floor surface 7, the generation of the incommunicable area due to the multipath interference can be suppressed. Accordingly, the beam is narrowed down in at least one direction irrespective of the scanning direction Sc. At least one direction of the directions to which the beam is narrowed down may intersect with the reflecting surface on which the strongest reflected wave is generated.

Each block of the reader/writer 2 may be formed with hardware logic, or may be put into practice by software using a CPU as described below.

Specifically, the reader/writer 2 includes a CPU for executing the instruction of a control program which performs each function, a ROM for storing the program, a RAM for executing the program, and a storage device (a recordable medium) such as a memory for storing the program and various kinds of data. The object of the present invention can be achieved in such a way that the recordable medium in which the program code (a program in an execution format, an intermediate code program, a source program) of the control program of the reader/writer 2 as the software for performing the above-described functions is recorded so as to be read by a computer is supplied to the reader/writer 2. Then, the computer (or the CPU or an MPU) reads and executes the program code recorded in the recordable medium.

As the recordable medium, for instance, tapes such as a magnetic tape or a cassette tape, disks such as a magnetic disk including a flexible disk/hard disk, etc. or an optical disk including a CD-ROM/MO/MD/DVD/CD-R, etc., cards such as an IC card (including a memory card)/optical card or semiconductor memories such as a mask ROM/EPROM/EEPROM/flash ROM may be employed.

Further, the reader/writer 2 may be connected to a communication network. The program code may be supplied through the communication network. The communication network is not especially limited to a specific network. For instance, an internet, an intranet, an extra net, a LAN, an ISDN, a VAN, a CATV communication network, a virtual private network, a telephone line network, a mobile communication network, a satellite communication network, etc. may be employed. A transmitting medium forming the communication network is not especially limited to a specific transmitting medium. For instance, a wired medium such as an IEEE 1394, a USB, a power line carrier, a cable TV line, a telephone line, an ADSL line, or a wireless medium such as an infrared ray including an IrDA or a remote controller, Bluetooth (registered trademark), a 802.11 radio, an HDR, a portable telephone network, a satellite line, a ground wave digital network may be employed. The present invention may be put into practice by a carrier wave in which the program code is embodied by an electronic transmission, or in a form of a data signal string.

In the RFID system according to the present invention, the scanning is performed with the beam so that the plane including the scanning direction of the beam of the radio wave transmitted from the antenna of the reader/writer intersects with the reflecting surface on which the strongest reflected wave is generated. Thus, the generation of the incommunicable area due to the multipath interference can be suppressed. Accordingly, the RFID system having the aspect of transmitting the radio wave may be applied to a radio wave of an arbitrary frequency.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An apparatus configured to be placed within a space defined by a plurality of reflecting surfaces and to communicate with an RFID (RadioFrequency Identification) tag through a radio wave, said apparatus comprising:
    at least one antenna configured to transmit a radio wave beam having a first directivity in a first direction and a second directivity which is lower than the first directivity in directions other than the first direction when the apparatus is placed within the space; and
    a scanning controller configured to cause the at least one antenna to change an advancing direction of the radio wave beam within a scanning plane when the apparatus is placed within the space,
    wherein the scanning plane intersects with one of the reflecting surfaces having higher reflectivity than the other reflecting surfaces at an angle falling within a range from 45 degrees to 90 degrees.

2. An apparatus for communicating with an RFID (RadioFrequency Identification) tag through a radio wave, said apparatus comprising:
    an antenna which communicates with the RFID tag and generates a scanning beam in a space, wherein said scanning beam is narrowed in at least one direction so as to cover a part of the space, and said at least one direction in which the beam is narrowed intersects with a reflecting surface that generates a relatively high intensity reflection;
    a scanning control section which controls the scanning with the beam of the radio wave transmitted from the antenna to the space;
    a communication section which communicates with the RFID tag through the antenna;
    a counting section which counts a number of the RFID tags with which the communication section completes the radio communication; and
    a scanning adjusting section for adjusting the scanning with the beam by:
        (a) instructing the scanning control section so as to make the antenna perform the scanning with the scanning beam at a certain scanning range and a certain incrementing angle for a certain scanning time;
        (b) acquiring the number of the RFID tags counted in the counting section during the scanning;
        (c) repeating (a) and (b) for various scanning ranges, incrementing angles and scanning times; and
        (d) determining the scanning range, incrementing angle and the scanning time so as to obtain a maximum number of the RFID tags counted in the counting section.

3. A method for adjusting a scanning beam transmitted from an antenna to a space, said antenna communicating with an RFID (Radio Frequency Identification) tag through a radio wave and generates the scanning beam in a space, wherein said scanning beam is narrowed in at least one direction so as to cover a part of the space, and said at least one direction in which the beam is narrowed intersects with a reflecting surface that generates a relatively high intensity reflection, said method comprising:
    (a) performing, using a computer, the scanning with the scanning beam at a certain scanning range and a certain incrementing angle for a certain scanning time;
    (b) counting, using the computer, a number of RFID tags whose radio communications with the antenna are completed during the scanning;
    (c) repeating, using the computer, (a) and (b) for various scanning ranges, incrementing angles and scanning times; and
    (d) determining, using the computer, the scanning range, the incrementing angle and the scanning time so that the counted number of the RFID tags is maximum.

4. A computer readable medium comprising a program including instructions for operating an apparatus for communicating with an REID (Radio Frequency Identification) tag through a radio wave, said apparatus having an antenna which communicates with the RFID tag and generates a scanning beam in a space, wherein said scanning beam is narrowed in at least one direction so as to cover a part of the space, and said at least one direction in which the beam is narrowed intersects with a reflecting surface that generates a relatively high intensity reflection, and a scanning control section which controls the scanning with the beam of the radio wave transmitted from the antenna, said instructions comprising:
    (a) instructing the scanning control section so as to make the antenna perform the scanning with the scanning beam at a certain scanning range and a certain incrementing angle for a certain scanning time;
    (b) acquiring the number of the RFID tags counted during the scanning;
    (c) repeating (a) and (b) for various scanning ranges, incrementing angles and scanning times; and
    (d) determining the scanning range, incrementing angle and the scanning time so as to obtain a maximum number of counted the RFID tags.

5. The apparatus as claimed in claim 1, wherein:
    the at least one antenna comprises:
    a plurality of antenna elements; and
    a phase shifter configured to shift phases of signals transmitted to the antenna elements so as to generate the radio wave beam.

6. The apparatus as claimed in claim 1, wherein the radio wave is a microwave.

7. The apparatus as claimed in claim 1, wherein:
the at least one antenna includes a plurality of antennas.

8. The apparatus as claimed in claim 1, wherein the apparatus is configured to be placed within the space so that the antenna is disposed separately from the one of the reflecting surfaces.

9. The apparatus as claimed in claim 7, wherein the apparatus is configured to be placed within the space so that at least two of the antennas are arrayed in a direction substantially perpendicular to the one of the reflecting surfaces.

10. The apparatus as claimed in claim 7, wherein the apparatus is configured to be placed within the space so that at least two of the antennas oppose each other across the space.

* * * * *